(12) United States Patent
Barnes et al.

(10) Patent No.: US 11,042,536 B1
(45) Date of Patent: Jun. 22, 2021

(54) SYSTEMS AND METHODS FOR AUTOMATED DATA VISUALIZATION

(71) Applicant: JPMorgan Chase Bank, N.A., New York, NY (US)

(72) Inventors: James Todd Barnes, Katy, TX (US); Vishal Mudgal, Singapore (SG)

(73) Assignee: JPMorgan Chase Bank, N.A., New York, NY (US)

( * ) Notice: Subject to any disclaimer, the term of this patent is extended or adjusted under 35 U.S.C. 154(b) by 403 days.

(21) Appl. No.: 15/696,848

(22) Filed: Sep. 6, 2017

Related U.S. Application Data

(60) Provisional application No. 62/383,736, filed on Sep. 6, 2016.

(51) Int. Cl.
  *G06F 16/23* (2019.01)
  *G06F 16/22* (2019.01)

(52) U.S. Cl.
  CPC ........ *G06F 16/2393* (2019.01); *G06F 16/221* (2019.01)

(58) Field of Classification Search
  CPC ........ G06F 16/26; G06F 17/15; G06F 17/153; G06F 17/16; G06F 8/70; G06F 8/77; G06F 16/2393; G06F 16/221; G06F 16/23; G06F 16/25; G06F 16/248; G06F 16/838; G06F 16/9038; G06F 16/9538; G06F 16/93; G06F 16/951; G06F 16/9535; G06F 40/194; G06F 16/148; G06F 16/156; G06F 16/168
  See application file for complete search history.

(56) References Cited

U.S. PATENT DOCUMENTS

| | | | |
|---|---|---|---|
| 6,957,225 B1* | 10/2005 | Zait | G06F 16/2264 |
| 9,633,076 B1* | 4/2017 | Morton | G06F 16/248 |
| 9,818,211 B1* | 11/2017 | Gibb | G06T 11/206 |
| 10,447,546 B1* | 10/2019 | Guo | H04L 41/12 |
| 2003/0188290 A1* | 10/2003 | Corral | G06Q 10/06398 |
| | | | 717/101 |
| 2005/0055369 A1* | 3/2005 | Gorelik | G06F 16/24544 |
| 2005/0240615 A1* | 10/2005 | Barsness | G06F 16/221 |
| 2007/0282784 A1* | 12/2007 | Modani | G06F 16/217 |
| 2008/0104016 A1* | 5/2008 | Atmaja | G06F 40/18 |
| 2009/0282218 A1* | 11/2009 | Raichelgauz | G06N 3/0454 |
| | | | 712/36 |
| 2012/0117500 A1* | 5/2012 | Maim | G06F 17/246 |
| | | | 715/769 |

(Continued)

*Primary Examiner* — David T. Brooks
(74) *Attorney, Agent, or Firm* — Hunton Andrews Kurth LLP

(57) ABSTRACT

Systems and methods for automated data visualization are disclosed. According to one embodiment, in an information processing apparatus comprising at least one computer processor, a method for automatically analyzing data from a plurality of data files and producing a visual output may include (1) receiving a plurality of data files from at least one data file source, each data file comprising a plurality of data columns; (2) identifying a number of columns in each of the data files; (3) using column-value matching to identify two matching columns from two different data files; (4) executing one or more machine learning algorithms on data in the data files to enrich the data; and (5) generating a first visualization for the enriched data and outputting the first visualization on a display.

20 Claims, 7 Drawing Sheets

(56) References Cited

U.S. PATENT DOCUMENTS

| | | | |
|---|---|---|---|
| 2013/0061202 A1* | 3/2013 | Nema | G06F 8/70 |
| | | | 717/101 |
| 2013/0311968 A1* | 11/2013 | Sharma | G06Q 10/06 |
| | | | 717/101 |
| 2014/0095542 A1* | 4/2014 | Zelevinsky | G06F 16/26 |
| | | | 707/776 |
| 2014/0096104 A1* | 4/2014 | Novak | G06F 8/70 |
| | | | 717/101 |
| 2014/0236660 A1* | 8/2014 | Cantor | G06Q 10/06313 |
| | | | 705/7.23 |
| 2014/0317591 A1* | 10/2014 | Rosomoff | G06F 8/70 |
| | | | 717/101 |
| 2015/0324346 A1* | 11/2015 | Sankaran | G06F 16/25 |
| | | | 715/212 |
| 2016/0092090 A1* | 3/2016 | Stojanovic | G06F 16/211 |
| | | | 715/771 |
| 2016/0171075 A1* | 6/2016 | Erenrich | G06F 16/2462 |
| | | | 707/738 |
| 2017/0109402 A1* | 4/2017 | Brewster | G06F 16/2456 |
| 2017/0235662 A1* | 8/2017 | Leask | G06F 11/3616 |
| | | | 717/125 |
| 2017/0249231 A1* | 8/2017 | Bofferding | G06F 11/3604 |
| 2017/0286981 A1* | 10/2017 | Shukla | G06Q 30/0205 |
| 2017/0365078 A1* | 12/2017 | Cailly | G06T 11/206 |

\* cited by examiner

| Data_File1 | | | Data_File2 | | |
|---|---|---|---|---|---|
| ID | Country | GDP (In Trillion $) | ID | Country | GDP |
| 1 | India | 2 | 1111 | India | 2.1 |
| 2 | USA | 17 | 2222 | Singapore | 0.32 |
| 3 | China | 9.2 | 3333 | USA | 16.9 |
| 4 | Brazil | 2.3 | 4444 | China | 9 |
| 5 | Singapore | 0.3 | 5555 | Brazil | 2 |

| Data_File3 | | Data_File4 | |
|---|---|---|---|
| ID | Country | Country | Currency |
| A | India | USA | USD |
| B | USA | UK | GBP |
| C | UK | India | INR |
| D | Maldives | France | Euro |
| E | Japan | Australia | AUD |

FIG. 3

|     | 1A | 2A | 3A | 4B | 5B | 6B | 7C | 8C | 9D | 10D |
|-----|----|----|----|----|----|----|----|----|----|-----|
| 1A  |    |    |    |    |    |    |    |    |    |     |
| 2A  |    |    |    |    |    |    |    |    |    |     |
| 3A  |    |    |    |    |    |    |    |    |    |     |
| 4B  |    |    |    |    |    |    |    |    |    |     |
| 5B  |    |    |    |    |    |    |    |    |    |     |
| 6B  |    |    |    |    |    |    |    |    |    |     |
| 7C  |    |    |    |    |    |    |    |    |    |     |
| 8C  |    |    |    |    |    |    |    |    |    |     |
| 9D  |    |    |    |    |    |    |    |    |    |     |
| 10D |    |    |    |    |    |    |    |    |    |     |

FIG. 4

|   | A | B | C | D | E | F | G | H | I | J | K |
|---|---|---|---|---|---|---|---|---|---|---|---|
| 1 |   | Data File1 | A |   |   | Data File2 | B |   |   | Data File3 | C |
| 2 |   | ID | Country | GDP (In Trillion$) |   | ID | Country | GDP |   | ID | Country |
| 3 |   | 1 | India | 2 |   | 1111 | India | 2.1 |   | A | India |
| 4 |   | 2 | USA | 17 |   | 2222 | Singapore | 0.32 |   | B | USA |
| 5 |   | 3 | China | 9.2 |   | 3333 | USA | 16.9 |   | C | UK |
| 6 |   | 4 | Brazil | 2.3 |   | 4444 | China | 9 |   | D | Maldives |
| 7 |   | 5 | Singapore | 0.3 |   | 5555 | Brazil | 2 |   | E | Japan |
| 8 | Columns | 1A | 2A | 3A |   | 4B | 5B | 6B |   | 7C | 8C |
| 9 |   |   |   |   |   |   |   |   |   |   |   |
| 10 |   |   |   |   |   |   |   |   |   |   |   |
| 11 |   |   |   |   |   |   |   |   |   |   |   |
| 12 |   |   |   |   | Every row in 2A is present in 5B 100% Match |   |   |   |   |   |   |

FIG. 5

|     | 1A | 2A | 3A | 4B | 5B | 6B | 7C | 8C | 9D | 10D |
|-----|----|----|----|----|----|----|----|----|----|-----|
| 1A  |    |    |    | 0%<br>0.9 | 0%<br>1 | 0%<br>0.7 | 0%<br>1 | 0%<br>1 | 0%<br>1 | 0%<br>1 |
| 2A  |    |    |    | 0%<br>1 | 100%<br>1 | 0%<br>1 | 0%<br>1 | 40%<br>1 | 40%<br>1 | 0%<br>1 |
| 3A  |    |    |    | 0%<br>1 | 0%<br>1 | 0%<br>0.2 | 0%<br>1 | 0%<br>1 | 0%<br>1 | 0%<br>1 |
| 4B  |    |    |    |    |    |    | 0%<br>1 | 0%<br>1 | 0%<br>1 | 0%<br>1 |
| 5B  |    |    |    |    |    |    | 0%<br>1 | 40%<br>1 | 40%<br>1 | 0%<br>1 |
| 6B  |    |    |    |    |    |    | 0%<br>1 | 0%<br>1 | 0%<br>1 | 0%<br>1 |
| 7C  |    |    |    |    |    |    |    |    | 0%<br>1 | 0%<br>1 |
| 8C  |    |    |    |    |    |    |    |    | 40%<br>1 | 0%<br>1 |

FIG. 6

SYSTEMS AND METHODS FOR AUTOMATED DATA VISUALIZATION

RELATED APPLICATIONS

This application claims priority to U.S. Provisional Patent Application Ser. No. 62/383,736, filed Sep. 6, 2016, the disclosure of which is hereby incorporated, by reference, in its entirety.

BACKGROUND OF THE INVENTION

1. Field of the Invention

The present invention generally relates to systems and methods for automated data visualization.

DESCRIPTION OF THE RELATED ART

The visualization of data allows a user to identify trends, and to address those trends as necessary. When data is received from different sources, it may be difficult and time-consuming to identify any relationships in the underlying data.

SUMMARY OF THE INVENTION

Systems and methods for automated data visualization are disclosed. According to one embodiment, in an information processing apparatus comprising at least one computer processor, a method for automatically analyzing data from a plurality of data files and producing a visual output may include (1) receiving a plurality of data files from at least one data file source, each data file comprising a plurality of data columns; (2) identifying a number of columns in each of the data files; (3) using column-value matching to identify two matching columns from two different data files; (4) executing one or more machine learning algorithms on data in the data files to enrich the data; and (5) generating a first visualization for the enriched data and outputting the first visualization on a display.

In one embodiment, the method may further include generating a column-correlation matrix based on a total number of data columns in the plurality of data files.

In one embodiment, the method may further include receiving feedback on the first visualization; and generating a second visualization for the enriched data based on the feedback.

In one embodiment, the data file source comprises one of a SQL database result, an XML file, a system log fil, a defect record, a production issue review, and a code review.

In one embodiment, the data in at least one of the data files comprises data in a CSV format.

In one embodiment, the method may further include arranging the plurality of data files in an array.

In one embodiment, using column-value matching to identify two matching columns from two different data files may include ignoring duplicate columns in the plurality of columns; and arranging the plurality of columns in a single matrix.

In one embodiment, the method may further include assigning a unique identifier to each column in each data file.

In one embodiment, the step of using column value matching to identify two matching columns from two different data files may include matching a value from each of the plurality of columns in a first data file with a value from a column in a second data file.

In one embodiment, the step of generating a first visualization for the enriched data may include using machine learning to select one of a plurality of visualization formats; and applying the enriched data to the selected visualization format.

In one embodiment, the visualization format may be selected based on a stored visualization format for the data.

In one embodiment, the method may further include generating a visualization format for the enriched data; and storing the visualization format in a library.

In one embodiment, the data may be enriched with global reference data.

According to another embodiment, a method for automatically analyzing data from a plurality of data files and producing a visual output related to a risk rating for a software release in an information processing apparatus comprising at least one computer processor is disclosed. The method may include: (1) retrieving a plurality of data sets related to a software release; (2) analyzing the plurality of data sets for issues; (3) updating a local cache with the issues; (4) identifying an existing visualization format for the data sets from a graphing configuration library; (5) generating at least one of a heat map visualization and a risk rating visualization; and (6) storing the at least one visualization on a collaboration server.

In one embodiment, the data sets may be retrieved periodically.

In one embodiment, the at least one visualization may include a trend identifier based on historical data.

In one embodiment, the method may further include modifying the visualization format for the data sets; and storing the modified visualization format for the data sets to the graphing configuration library.

In one embodiment, the method may further include enriching the data sets with global reference data. In one embodiment, the global reference data comprises static data.

In one embodiment, the method may further include generating a dynamic legend for the at least one visualization.

BRIEF DESCRIPTION OF THE DRAWINGS

For a more complete understanding of the present invention, the objects and advantages thereof, reference is now made to the following descriptions taken in connection with the accompanying drawings in which:

FIG. 3 depicts exemplary data files according to one embodiment;

FIG. 4 depicts an exemplary table according to one embodiment;

FIG. 5 depicts an exemplary matrix according to one embodiment; and

FIG. 6 depicts an exemplary data correlation table according to one embodiment;

DETAILED DESCRIPTION OF PREFERRED EMBODIMENTS

Embodiments disclosed herein are directed to systems and methods for automated data visualization.

In general, charting tools require the X and Y axis (and sometimes the Z axis) data to be defined in their respective format in order to graphically present data to a user (e.g., in a chart). According to embodiments disclosed herein, rather than having the identify the relationship of the data to an axis, machine learning algorithms may be used to identify the axis data from the data received, and may provide some or all possible visualizations.

Figure 1:
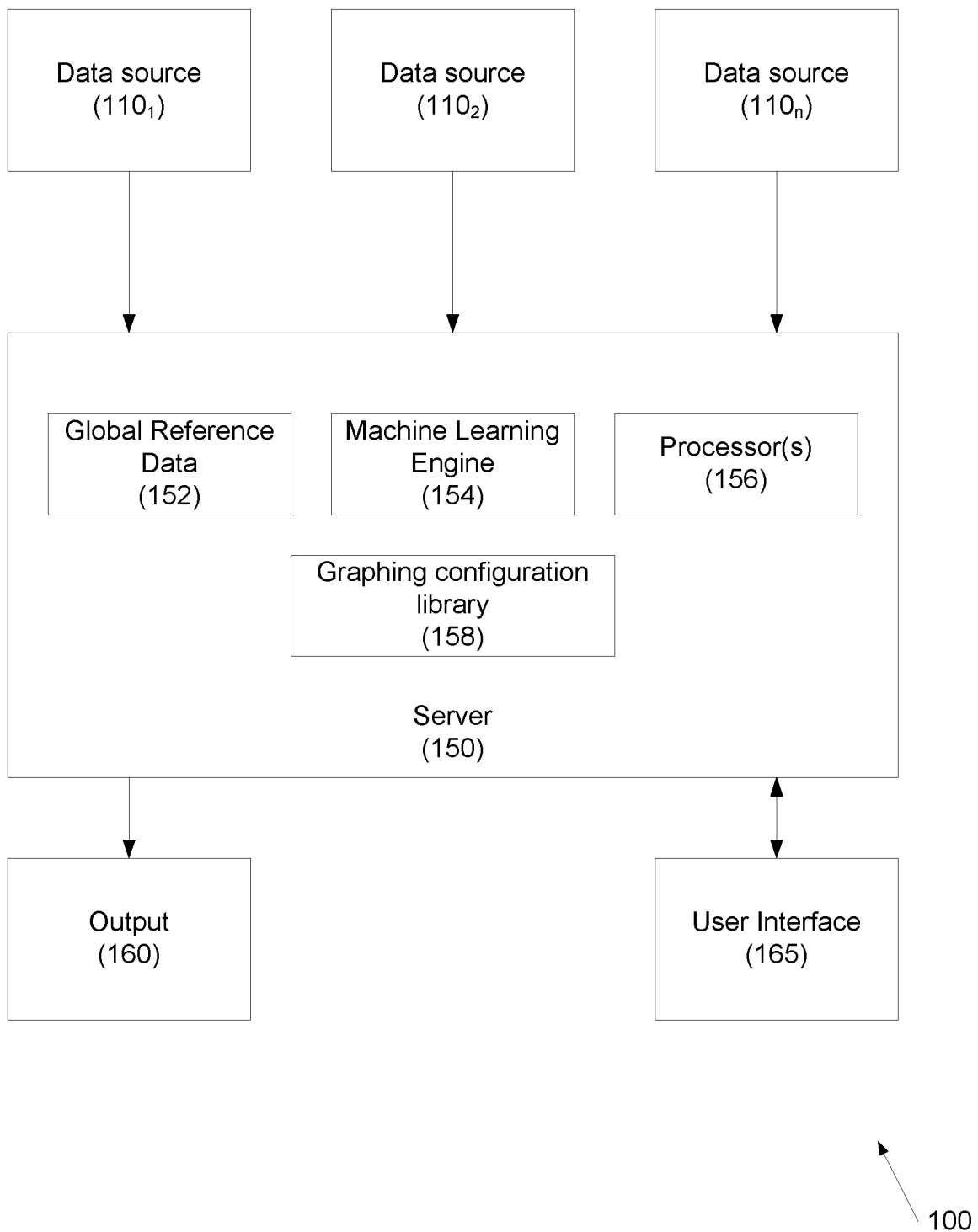
FIG. 1 depicts a system for automated data visualization according to one embodiment.

Referring to FIG. 1, a system for automated data visualization is disclosed according to one embodiment. System 100 may include one or more data source $110_1$, $110_2$, . . . $110_n$, server 150, output 160, and user interface 165. In one embodiment, output 160 and user interface 165 may be the same device, such as a touch-sensitive screen.

In one embodiment, data sources 110 may include any data source which may be presented in a table for comparison and for graphing. This may include, for example, SQL database results, XML files, spreadsheets, system log files, defect records (open and reopened), production issues, code reviews, etc.

In one embodiment, data source(s) 110 may provide data as data files. These data files may be co-related to each other (e.g., for improved efficiency), or they may not have any correlation. In one embodiment, the data may be provided in any suitable format, manner, etc. For example, data may be provided as CSV files, Excel files, etc.

In one embodiment, server 150 may include one or more memory that may store, for example, global reference data 152. In one embodiment, global reference data 152 may be information that serves as the system of record. For example, the input data may be a list of servers found within a particular network environment (e.g., development). The input data may be compared to global reference data 152 to determine if all available servers are in service. As an example, if global reference data 152 stated that there should be ten servers in a network environment, and there are only five, the difference between the expected and the actual can be graphed as an area map denoting the two data areas (e.g., expected versus actual).

In one embodiment, server 150 may include machine learning engine 154 that may apply one or more machine learning algorithm to data received from data sources 110.

Server 150 may further include one or more processors 156.

In one embodiment, system 100 may further include Graphing Configuration Library 158 (GCL) in which previous data correlations may be stored. For example, if a correlation between open and reopened defects were previously recorded, the processing algorithm would reference this correlation between database fields as well as the graphing profile (such as orientation, axis options, graph type (e.g., line, column, etc.), series identifiers, etc.) that was confirmed by the user on a previous run to generate the graphing. By referencing this library, consistent graphs across the same data set may be generated and user confirmation may be reduced or minimized.

Figure 2:
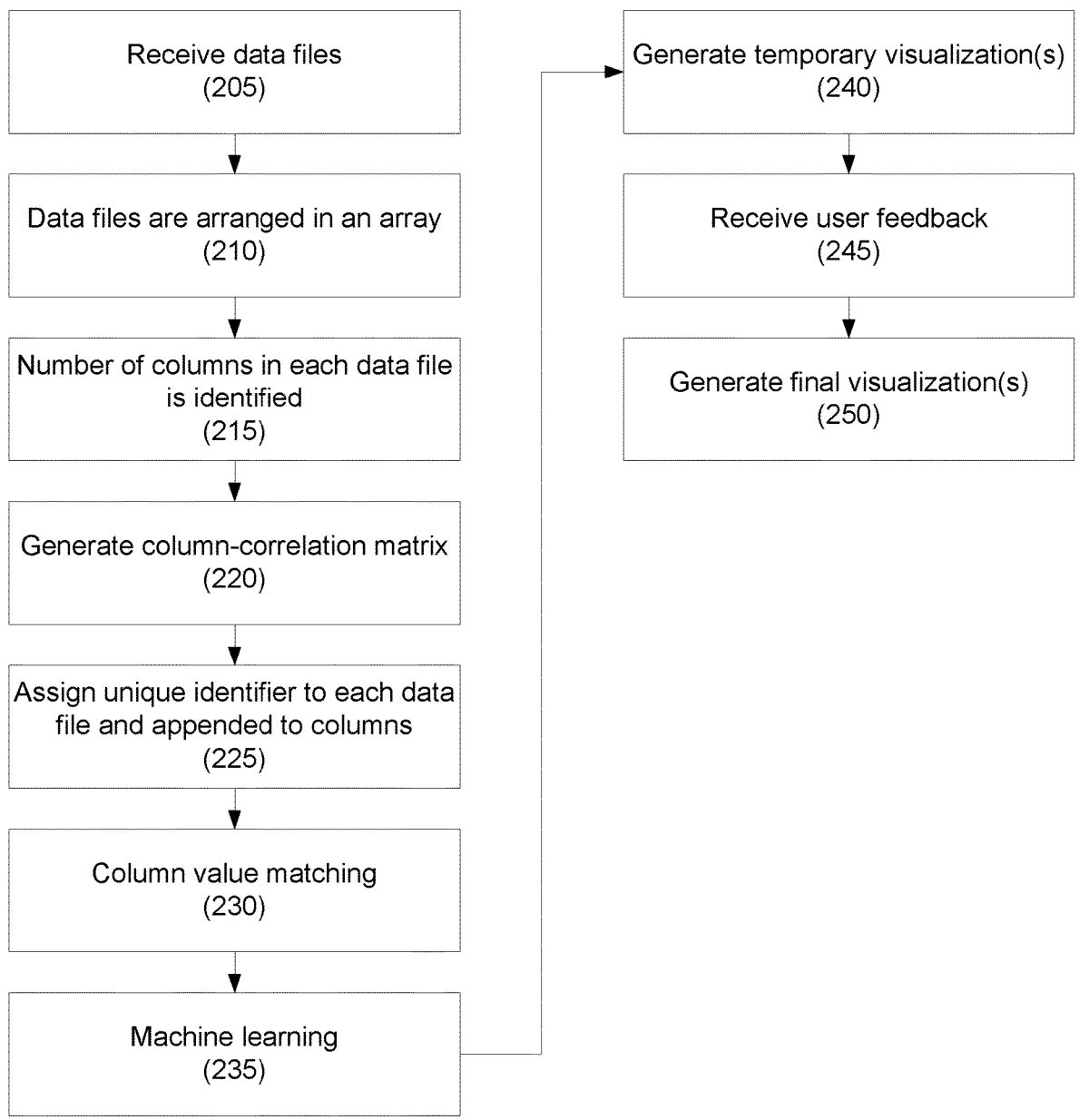
FIG. 2 depicts a method for automated data visualization according to one embodiment.

Referring to FIG. 2, a method for automated data visualization is disclosed according to one embodiment. In step 205, data files may be received from one or more data source. As discussed above, the data files may be co-related to each other, or they may not have any correlation. In one embodiment, the data may be provided in any suitable format, manner, etc. For example, data may be provided as CSV files, Excel files, etc.

The data files may be related to any suitable subject. In an computer programming environment, for example, the files may be related to computer program defects, errors, documentation, etc.

In one embodiment, the data may be retrieved periodically, as desired, etc. In one embodiment, machine learning may be used to identify data that may be retrieved on a recurring basis and may automatically stage that data before it is specifically requested for retrieval.

For the following illustrative example, the data files in FIG. 3 may be used.

In step 210, the data files may be arranged, or stored, in an array.

In step 215, the number of columns in each data file may be identified. In one embodiment, the server may identify the number of columns in each data file. For example, for the data files in FIG. 3, the column count is [3, 3, 2, 2].

In step 220, a column-correlation matrix may be generated. In one embodiment, duplicate columns that occur in the same or different data files may be ignored, and the total number of columns in the data file may be calculated. For example, for the data files in FIG. 3, the total number of columns may be determined by summing the number of columns, which equals 10.

A matrix having a size of the sum of the column count by the sum of the column count may be generated. In the example above, the matrix is a 10 by 10 matrix.

In step 225, a unique identifier may be assigned to each data file. Any suitable identifier may be used as is necessary and/or desired. For example, each data file may be assigned a unique character or character string, such as "A", "B", "C", etc. For example, for the data files in FIG. 3, Data_File1 is assigned A, Data_File2 is assigned B, Data_File3 is assigned C, and Data_File4 is assigned D. Each unique identifier may be appended to the matrix so that it is clear which column is from which data file. For the example, the matrix illustrated in FIG. 4 may be created.

In step 230, the values, or data, in the columns from each data file (or unique identifier) may be matched with values (data) in columns from the other data files (or unique identifiers).

In one embodiment, one or more computer processors at the server may establish a correlation between different columns in the data files based on the data in the data files. This may include, for example, auto-discovery of relational mapping between the columns. In one embodiment, the system may evaluate the columns in each file and may identify matches between data in different columns in different data files in order to determine the correlation between the columns. In one embodiment, the relationship may be determined based on the number and/or percentage of data matches.

In one embodiment, the data may be matched among the columns in all of the data files. Once a match is identified and corroborated by an end-user, then this correlation may be stored in a Graphing Configuration Library for future runs of the process.

For example, for the data files in FIG. 3, the values in column 1 may be matched with the values in columns 4-10, the values in column 2 may be matched with the values in columns 4-10, etc. In one embodiment, columns from the same data file may not be matched. In another embodiments, all columns, regardless of data file, may be matched.

In one embodiment, the matching of values may incorporate, for example, the percent of row values matched. In another embodiment, a value variance may be used, which weights may be assigned to differences in each row, and the total variance score may be generated for each row. The variance value may be within a range of −1 to +1. A value close to 0 may indicate a close match.

Based on example data and above rules, a matrix, such as that illustrated in FIG. 5, and a data correlation table, such as that illustrated in FIG. 6, may be created. In one embodiment, the data correlation table may be formatted for the results of the correlation algorithm and may include the best match percentages, the variance, etc. In one embodiment, color coding (e.g., green-yellow-red) may be used to indicate a strong column relationship (e.g., green), a plausible relationship (e.g., yellow), and a weak relationship (e.g., red).

In step 235, a machine learning engine may execute one or more machine learning algorithms on the data in the data files. For example, the relationally-mapped data may be provided to the machine learning engine which may enrich the data and may optimize resources, performing predictive analysis, and then generate visualizations.

In one embodiment, data (and data files) that were previously correlated (and therefore mapped) may be referenced from the Graphing Configuration Library (GCL) so as to not go through the process of remapping existing relations where applicable. If two data files (from two sources) are obtained, and the mapping already exists within the GCL, then the process of preparing the Data Correlation Table may not be necessary and may not be performed.

In one embodiment, the relationally-mapped data may be mapped using Global Reference Data, and the user may define in what ways the data should be enriched. For example, a data file containing only the IP address may be enriched by identifying the country that the IP address originated from. In another embodiment, different statistical elements may be added to the data. Examples include mean, median, standard deviation, etc.

In one embodiment, based on the data, one or more machine learning algorithm may perform predictive analysis. For example, user growth may be predicted based on the historical trends. The algorithm may then predict and/or identify additional resources that may be required to handle the increase.

The system may compute some or all of the variables, and may identify some or all possible charting options using those variables. For example, the system may identify different chart types, different chart formats, different chart presentations, etc. Machine-generated charts may cover some or all charting options and possibilities.

In step 240, one or more visualizations based on the data processing and the machine learning may be generated. In one embodiment, the visualization(s) may be presented to the user on one or more output, such as a display.

In step 245, the server may receive feedback from the user on the visualization(s), and this feedback may be provided to the machine learning engine. For example, using a web interface, a user may accept or reject a visualization based on requirements. In one embodiment, user feedback may be fed back into the system and more visualizations may be generated. The user may also merge different elements from two different visualizations and the same selection may be provided as feedback. The feedback process may continue until the user accepts the visualization(s). The accepted visualization(s) may be saved as preferences for the same or similar data.

In one embodiment, feedback may not be provided, and no additional visualizations may be generated.

Figure 7:
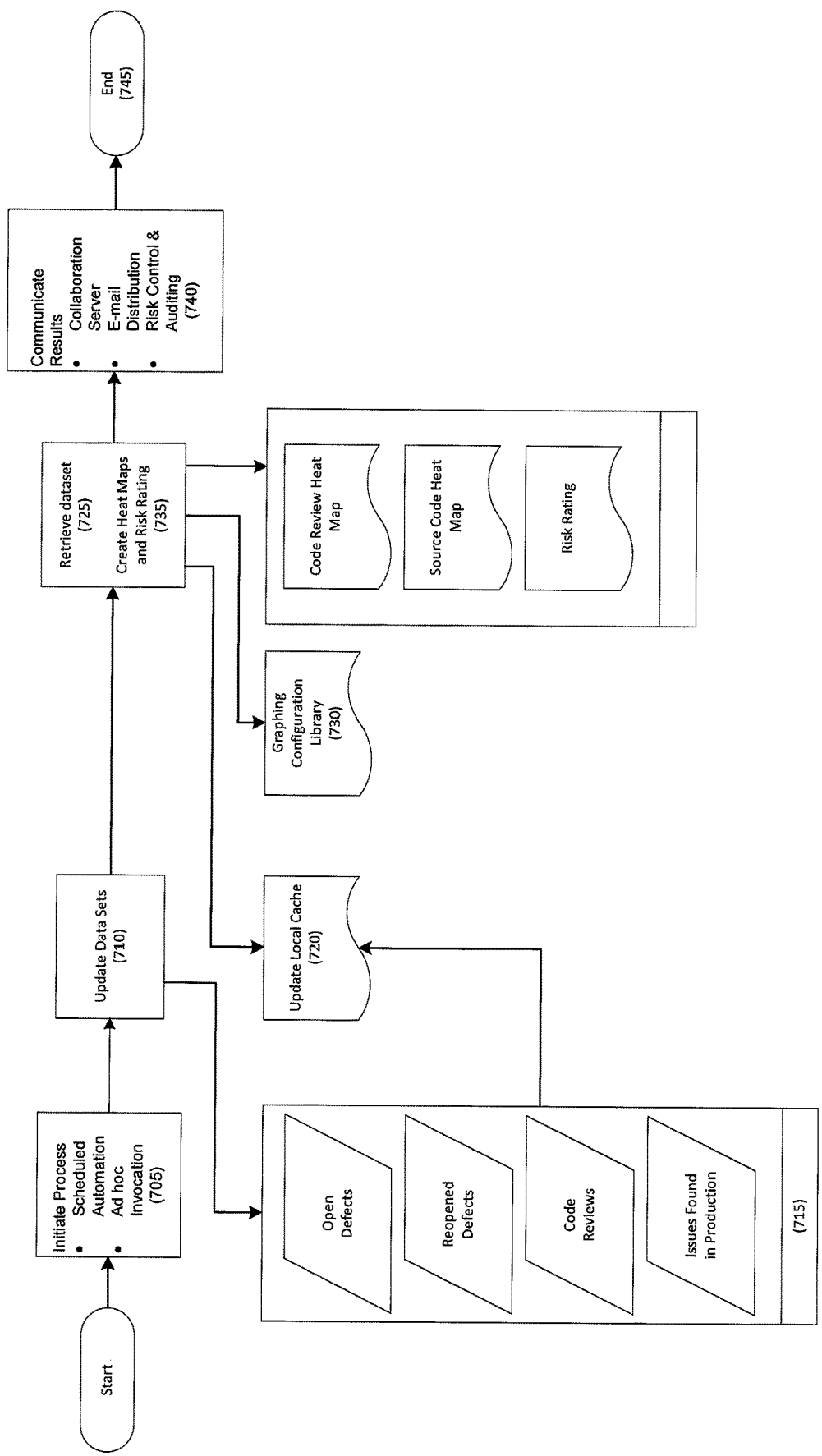
FIG. 7 depicts a method for automated analysis and graphing of a release's risk rating according to one embodiment.

Referring to FIG. 7, an exemplary method for automated analysis and graphing of a release's risk rating is provided according to one embodiment. Note that although this process is disclosed in the context of a software release, it should be recognized that the embodiments disclosed herein have broad applicability.

In step 705, the process may be initiated. For example, the process may be invoked via a calendar schedule, per event (such as a release, a source code check-in, a build, etc.), or as an ad hoc update for an ongoing risk analysis profile.

In step 710, data sets may be updated. For example, in one embodiment the process may connect to external defect tracking databases to generate a listing (e.g., by project or a collection of projects) of existing open defects, reopened defects, and issues discovered in the production environment.

The process may also connect to external source control systems to generate the number, the acceptance rate, and the specific location within the source code repository of existing code reviews.

In step 715, the data layer may analyze the data. For example, in one embodiment, the data may be analyzed for, for example, open defects, reopened defects, code reviews, and issues found in production. Open defects may denote existing system errors/issues. This data view provides a baseline of the platform's current risk from the defect backlog.

Reopened defects may denote issues that were assumed to be corrected (via source code changes), yet the changes did not remediate the issue.

Code Reviews may denote a submission, review, and approval process whereby changes to the source code are validated by senior software developers, platform leads, or by management.

Production issues denote errors found as part of the live-environment and will be recorded as either new defects in the backlog or as a consequence of issues assumed to be remediated resulting in a reopened defect.

In step 720, the local cache may be updated. For example, the retrieved data (open defects, reopened defects, code reviews, production issues) may be cached to the server to increase overall performance and to reduce network traffic.

In step 725, the data set may be retrieved from, for example, the local cache.

In step 730, based on the data set, one or more existing graphing configuration library may be accessed from, for example, the graphing configuration library, in order to generate one or more visualization. For example, if no existing configuration is identified, a new configuration based upon the end-user validation may be generated. In one embodiment, the information may be presented to the user to determine the correct correlation between the data. The user may set the graphing options, and this configuration may be saved to the graphing configuration library for future use.

Next, in step 735, visualizations, such as heat map(s) and risk rating(s), may be generated, based on the data set and any existing graphing configuration.

For example, a Code Review Heat Map may present area(s) in the source code (e.g., by repository, by directory, by file, etc.) whereby reviews of the source code were initiated with a denotation of the number of approvals versus rejections of source code submissions. This process may provide the end-user the number of valid versus invalid commits to the source code repository. For example, a high number of accepted commits denote a lower overall risk rating, whereas multiple rejected commits denotes a lower source code quality (e.g., failure to build, inefficient code, changes introduce a security vulnerability, etc.).

The Source Code Heat Map may present area(s) of the source code repository that are new, historical (e.g., older than one year), frequently updated, and/or can be traced to production defects. This process provides the end-user with areas of the source code repository that are of possible concern and, if included within a release, may increase the overall risk to the platform.

The Risk Rating may combine the calculations of the previous heat map generation to create an overall rating based upon a ratio of newly introduced source code, areas of the code which have a high number of changes, areas of the source code that were traced to reopened defects and/or production defects.

If previous risk ratings were created, the results will be graphed with an overall trend line denoting historical data for comparison.

In step 740, the resulting data (e.g., the heat maps and risk rating) may be stored on a collaboration server for review and for historical trending.

The information may be exported into a variety of formats (such as a Word document or a PDF) or an in-line HTML e-mail message for distribution to specific individuals and/or distribution groups.

In step 745, the process may be completed. For example, if the process was initiated via an ad hoc invocation, a message will be outputted to the console that the process has completed or failed with a listing of errors logged to an external file for analysis.

A non-limiting, illustrative example is provided in the context of application component maturity level analysis. For the following illustrative example, the following exemplary data files may be used.

A first data file (Data File A) may be provided that may include, for example, existing open defects. The defects may include, among other things, the source code repository name and the component in which the error is occurring. Other defect data may be included as is necessary and/or desired.

A second data file (Data File B) may include, for example, existing quality code scans which may include, for example, the repository name and the components that are located within the repository. Other code scan data may be included as is necessary and/or desired.

A third data file (Data File C) may be provided that may include, for example, the number, dates, and directory/file locations of the changes to the source code repository. Using the directory naming convention, the underlying component name can be derived. For example, if the repository contains a sub-directory entitled "ui-authentication" then the component name and any commits under this directory will be for the component "ui-authentication".

A forth data file (Data File D) may be provided that may include, for example, comments, approvals/rejections, as well as the repository name and the sub-directory and file location of the code being reviewed. Using the same naming convention method, the component will be derived using the file's full path.

In one embodiment, the disclosed process may correlate the data files along two information points, such as repository name and component name. If the correlation was previously saved within the Graphing Configuration Library, a visualization (or graph) may be created with the predefined options. If none are present, then a new configuration may be selected and corroborated with the user (including all options) and saved for future use.

The visualizations provide a broad outline of the developmental maturity of the repository component by providing a visual rendering of open defects, code quality scans, the number of repository commits, and the number of code reviews for the specific component. If the number of open defects is elevated, the maturity of the application will be deemed as low. If the quality code scans reveal issues such as vulnerabilities, memory leaks, or inefficiencies and/or deviations from coding standards, the component will lack maturity. Likewise, if the number of commits is high, this denotes a large change set based upon developmental testing that denotes issues within the current application component. If there are a high number of code reviews this is a determination that there is oversight of the application component's development and provides a higher maturity rating; conversely, a low number of code reviews and/or a high number of rejected code commits denote an overall lower maturity score.

In one embodiment, a dynamic legend may be provided to simplify review of the results. For example, a dynamic legend may provide that a high number of code reviews is desirable.

In one embodiment, data trends over a period of time may be identified, such as the number of open defects is decreasing, the number of code reviews is consistent, etc.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for automatically analyzing data from a plurality of data files and producing a visual output, comprising:
   in an information processing apparatus comprising at least one computer processor:
      receiving the plurality of data files from at least one data file source, each data file comprising a plurality of data columns;
      identifying a number of columns in each of the data files;
      using column-value matching to identify two matching columns from two different data files;
      executing one or more machine learning algorithms on data in the data files to enrich the data;
      generating a first visualization for the enriched data and outputting the first visualization on a display; and
      generating and displaying a column-correlation matrix; wherein a size of the column correlation matrix is based on a sum of a total number of data columns in the plurality of data files, including at least a first, second, and third data file, wherein each cell of the column correlation matrix represents a different one of a pair of the data columns in the at least first, second, or third data files, and at least one correlation value is displayed in one of the cells of the column-correlation matrix showing a correlation of the pair of data files represented in the cell.

2. The method of claim 1, further comprising:
   receiving feedback on the first visualization; and
   generating a second visualization for the enriched data based on the feedback.

3. The method of claim 1, wherein the data file source comprises at least one of a SQL database result, an XML file, a system log file, a defect record, a production issue review, and a code review.

4. The method of claim 1, wherein data in at least one of the data files comprises data in a CSV format.

5. The method of claim 1, further comprising:
   arranging the plurality of data files in an array.

6. The method of claim 1, wherein using column-value matching to identify two matching columns from two different data files comprises:
   ignoring duplicate columns in the plurality of columns; and
   arranging the plurality of columns in a single matrix.

7. The method of claim 1, further comprising:
   assigning a unique identifier to each column in each data file.

8. The method of claim 1, wherein the step of using column value matching to identify two matching columns from two different data files comprises:
   matching a value from each of the plurality of columns in a first data file with a value from a column in a second data file.

9. The method of claim 1, wherein the step of generating a first visualization for the enriched data comprises:
   using machine learning to select one of a plurality of visualization formats; and
   applying the enriched data to the selected visualization format.

10. The method of claim 9, wherein the visualization format is selected based on a stored visualization format for the data.

11. The method of claim 1, further comprising:
    generating a visualization format for the enriched data; and
    storing the visualization format in a library.

12. The method of claim 1, wherein the data is enriched with global reference data.

13. The method of claim 1, wherein each of the plurality of columns of the first, second, and third data files are represented on both rows and columns of the column-correlation matrix, and each of the correlation values are displayed in one of a elements intersected by the rows and columns of the column-correlation matrix according to the position of each respective element.

14. A method for automatically analyzing data from a plurality of data files and producing a visual output related to a risk rating for a software release, comprising:
    in an information processing apparatus comprising at least one computer processor:
       retrieving a plurality of data files related to a software release;

analyzing the plurality of data sets for issues;
updating a local cache with the issues;
identifying an existing visualization format for the data sets from a graphing configuration library;
generating at least one visualization; wherein the at least one visualization comprises a graph depicting a trend line based on a current risk rating and at least one previous risk rating; wherein the current risk rating and the at least one previous risk rating is based on a number of approvals and rejections of source code submissions; and
storing the at least one visualization on a collaboration server.

15. The method of claim 14, wherein the data sets are retrieved periodically.

16. The method of claim 14, further comprising:
modifying the visualization format for the data sets; and
storing the modified visualization format for the data sets to the graphing configuration library.

17. The method of claim 14, further comprising:
enriching the data sets with global reference data.

18. The method of claim 17, wherein the global reference data comprises static data.

19. The method of claim 14, further comprising:
generating a dynamic legend for the at least one visualization.

20. The method of claim 14, wherein the risk rating is further based on one of a ratio of newly introduced source code, areas of the code which have a high number of changes, and areas of the source code that were traced to reopened defects and/or production defects.

* * * * *